Dec. 20, 1927.  
H. G. JORGENSEN  
ANTIRATTLE JOINT STRIP  
Filed July 25, 1923  
1,653,012
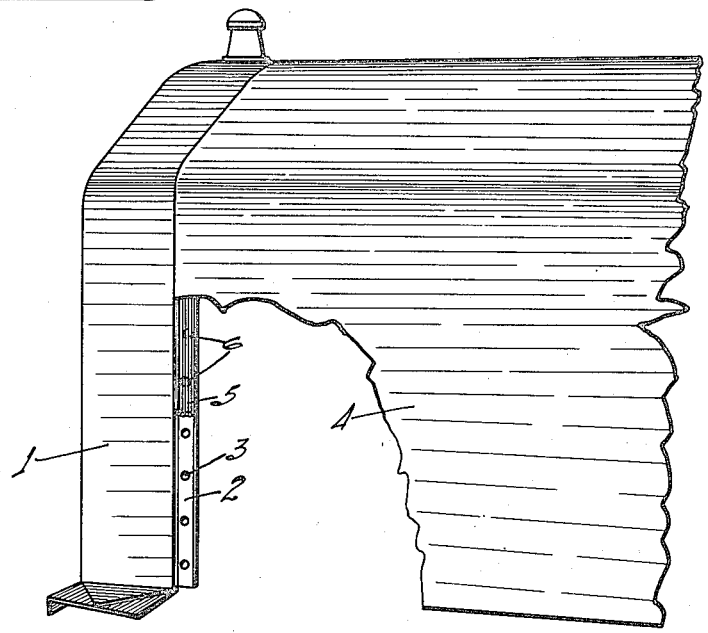
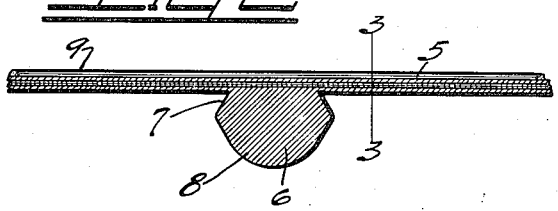
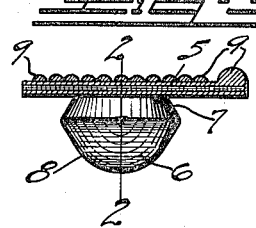
Inventor  
Hans G. Jorgensen  
By *W. R. Lord*  
Attorney Patented Dec. 20, 1927.

1,653,012

UNITED STATES PATENT OFFICE.

HANS GOTFRED JORGENSEN, OF ERIE, PENNSYLVANIA.

ANTIRATTLE JOINT STRIP.

Application filed July 25, 1923. Serial No. 653,781. REISSUED

This invention is of particular advantage in joints such as exist between the hood of an automobile and the supporting surfaces at the end of the hood at the back of the radiator and at the front of the ordinary cowl. These surfaces or seats are usually provided with perforations through which leather lacings are arranged to silence the relative movement of the parts. The object of the invention is to provide a convenient means for surfacing this and similar joints.

The invention is illustrated in the accompanying drawings as follows:—

Fig. 1 shows a perspective view of a portion of a hood.

Fig. 2 a longitudinal section of a silencing strip on the line 2—2 in Fig. 3.

Fig. 3 a section on the line 3—3 in Fig. 2.

1 marks the hood, 2 a seat at the rear of the hood such as is ordinarily used in automobiles, the seat being usually of sheet metal and having perforations 3. A typical hood 4 is shown resting on the seat 2.

A silencing strip 5 is formed of rubber and has a series of projections 6, these projections being spaced apart to correspond with the spacing of the perforations 3 as indicated in dotted lines in Fig. 1. The projections 6 have an undercut portion 7 which when in place in the openings 3 lock the projections in the openings through the elasticity of the rubber.

In an application filed by me, Serial Number 641,374 filed May 25th, 1923, I have shown the projections having an undercut portion as 7 in a rubber strip broadly similar to the strip herein shown. Some difficulty has been experienced in forcing the rubber projections into the openings 3 and in order to overcome this objection I provide a tapered extension 8 by means of which the projection may be readily started in the perforation 3 and thus compressed radially so that the projection can be readily pressed through the opening into place.

As a wearing surface I provide ribs 9 which extend in a longitudinal direction relatively to the strip. These not only afford a desirable surface for the seat of the hood but where there is an open fit of the hood these ribs make a natural finish along the edge of the hood.

What I claim as new is:—

1. An anti-rattle joint strip of yielding and stretchable material with projections formed on one face thereof adapted to enter perforations in a joint member to secure the strip in place, said projections comprising an undercut portion adapted to yieldingly enter the perforations and hold the strip in place thereon, said undercut portion having a tapered extension facilitating the entry of the projections into the perforations.

2. In an antirattle joint device of yielding and stretchable material comprising a contact portion having a bulb shaped projection from one face thereof adapted to enter perforations in a joint member to secure the strip in place, said projection comprising an undercut portion formed by the under side of the bulb shaped projection, the tapered outer portion of the projection facilitating the entry of the projection into the perforation.

In testimony whereof I have hereunto set my hand.

HANS GOTFRED JORGENSEN.